United States Patent
Abadie

(10) Patent No.: US 12,117,954 B2
(45) Date of Patent: Oct. 15, 2024

(54) METHOD OF DIALOGUE WITH A COMPUTER ON AN ON-BOARD BUS OF A VEHICLE

(71) Applicants: RENAULT s.a.s., Boulogne-Billancourt (FR); NISSAN MOTOR CO., LTD., Yokohama (JP)

(72) Inventor: Eric Abadie, Boulogne-Billancourt (FR)

(*) Notice: Subject to any disclaimer, the term of this patent is extended or adjusted under 35 U.S.C. 154(b) by 0 days.

(21) Appl. No.: 17/620,470

(22) PCT Filed: May 29, 2020

(86) PCT No.: PCT/EP2020/065039
§ 371 (c)(1),
(2) Date: Dec. 17, 2021

(87) PCT Pub. No.: WO2020/259956
PCT Pub. Date: Dec. 30, 2020

(65) Prior Publication Data
US 2022/0245085 A1     Aug. 4, 2022

(30) Foreign Application Priority Data
Jun. 25, 2019  (FR) ...................... 1906883

(51) Int. Cl.
*G06F 13/40* (2006.01)
*G06F 13/14* (2006.01)

(52) U.S. Cl.
CPC .......... *G06F 13/4068* (2013.01); *G06F 13/14* (2013.01); *G06F 13/4004* (2013.01)

(58) Field of Classification Search
CPC .... G06F 13/4068; G06F 8/65; G06F 13/4027; G06F 13/4004; G06F 13/4009; G06F 13/4059; G06F 13/38; G06F 13/14
See application file for complete search history.

(56) References Cited

U.S. PATENT DOCUMENTS 9,881,165 B2 *   1/2018  Litichever ........... H04L 63/1425
11,822,649 B2 * 11/2023  Kerstein ............... G06F 21/554
(Continued)

FOREIGN PATENT DOCUMENTS

WO    WO 2019/069308 A1    4/2019

OTHER PUBLICATIONS

International Search Report issued on Aug. 19, 2020 in PCT/EP2020/065039 filed on May 29, 2020, 2 pages.

*Primary Examiner* — Idriss N Alrobaye
*Assistant Examiner* — Richard B Franklin
(74) *Attorney, Agent, or Firm* — Oblon, McClelland, Maier & Neustadt, L.L.P.

(57) ABSTRACT

For dialogue from a first on-board bus in a vehicle, with a first computer connected to a second on-board bus, connected to the first bus by a second computer, with a main command being processed for the first computer: a third computer generates a command to write a description of the main command in a first dedicated zone of the second computer, then transmits the write command to the second computer; the second computer transmits, to the first computer, auxiliary command(s) to respond to the main command after receiving the write command; the third computer transmits a command to read the second dedicated zone, to the second computer such that the second computer transmits a response to the received read command; the third computer responds to the main command upon receipt of a response to the command to read a second zone of the second computer.

17 Claims, 6 Drawing Sheets

(56) References Cited

U.S. PATENT DOCUMENTS

| | | | |
|---|---|---|---|
| 2015/0071115 A1* | 3/2015 | Neff | H04L 43/12 |
| | | | 370/254 |
| 2015/0242198 A1* | 8/2015 | Tobolski | H04L 67/34 |
| | | | 717/172 |
| 2016/0294855 A1* | 10/2016 | Maeda | B60R 16/0231 |
| 2017/0351445 A1* | 12/2017 | Shimomura | G06F 15/7821 |
| 2018/0203685 A1 | 7/2018 | Nakamura et al. | |
| 2018/0217953 A1* | 8/2018 | Cross | G06F 13/364 |
| 2020/0389791 A1* | 12/2020 | Takemori | H04L 9/08 |

* cited by examiner

METHOD OF DIALOGUE WITH A COMPUTER ON AN ON-BOARD BUS OF A VEHICLE

BACKGROUND

The invention relates to a method for dialoguing with a computer on an on-board bus of a vehicle. The invention particularly relates to a method for dialoguing from a first on-board bus in a vehicle, with a first computer connected to a second on-board bus of the vehicle.

The method according to the invention is particularly useful for updating on-board computers, whilst at the same time allowing real-time programs to be executed for operating the vehicle.

Updating on-board computers and executing real-time programs generally requires commands to be transmitted over one or more on-board buses. Timers are generally implemented to control the duration that separates the transmission of a command from the reception of a response to this command, having the disadvantage of increasing the duration when the amount of commands increases.

For example, document EP 1434129 A2 discloses a device for controlling rewriting for an on-board program, in which a switching command is based on a signal originating from a timer. The disclosed device controls two operational modes, a normal mode, which could correspond to a diagnostic mode, and a rewrite mode for rewriting the on-board program, which can be used for a computer update. The disclosed device switches from the normal mode to the rewrite mode when it receives a program rewrite command originating from a server, and switches from the rewrite mode to the normal mode when it receives a command to switch to the normal mode during the rewrite mode. Each switching operation has the disadvantage of exiting the ongoing mode.

BRIEF SUMMARY

In order to overcome the disadvantages raised in the prior art, the aim of the invention is a method for dialoguing from a first on-board bus in a vehicle, with a first computer connected to a second on-board bus of the vehicle, the first bus being connected to the second bus by a second computer, wherein a third computer connected to the first on-board bus processes a main command intended for the first computer, comprising steps in which:
the third computer generates a command to write a description of said main command in a first dedicated zone of the second computer;
the third computer transmits said write command to the second computer when the second computer is detected as ready to respond to said write command;
the second computer transmits one or more auxiliary commands to the first computer in order to respond to the main command after receiving said write command;
the first computer transmits a response to each received auxiliary command;
the second computer stores each received response in a second dedicated zone;
the third computer transmits a command to read said second dedicated zone intended for the second computer when the second computer is detected as ready to respond to said read command;
the second computer transmits a response to the received read command;
the third computer responds to the main command upon at least one receipt of a response to the command to read the second zone of the second computer, in which the response transmitted by the first computer is stored.

In particular, a signal in two states, ready, not ready, is periodically transmitted by the second computer, for which the method comprises steps in which the second computer sets the signal:
to the occupied state upon receipt of the write command originating from the third computer;
to the ready state upon receipt of the response originating from the first computer.

Advantageously, the method comprises a step, in which the third computer goes into standby for the signal set to the ready state after having received said signal set to the occupied state.

In particular, said write command comprises a first frame, which comprises a first identifier field for a command, a first identifier field for the first dedicated zone, and at least one description field for the main command.

Also in particular, the description of the main command comprises a standard field for the main command, an identification field for the second computer, and a useful data identification field for the second computer for establishing the transmitted response.

Also in particular, the method comprises a step, in which the second computer transmits an acknowledgement intended for the first computer upon receipt of said write command.

More specifically, the acknowledgement comprises a second frame, which comprises an acknowledgement identifier field and a second identifier field for the first dedicated zone.

More specifically, said read command transmitted by the third computer comprises a third frame, which comprises a second command identification field and a first identifier field for the second dedicated zone.

Also in particular, said response to the read command comprises a fourth frame, which comprises a fourth identifier field for the response to the command, a second identifier field for the second dedicated zone, at least one description note field for the main command, and a content field for the response transmitted by the first computer.

Specifically, said main command is a command for reading resident data in the first computer, for which the auxiliary command comprises a fifth frame, which comprises an identification field for a read command and an identification field for said resident data, so that the response transmitted by the first computer comprises a sixth frame, which comprises an identification field for a response to the read command, an identification field for said resident data, and a field containing the value for said resident data.

Preferably, the read commands and the write commands are commands in accordance with the UDS (Unified Diagnostic Services) protocol.

The method can also comprise steps in which:
the second computer checks whether or not the description of said main command is complete upon receipt of said write command;
the second computer transmits one or more auxiliary commands to the first computer in order to respond to the main command only if the description of said main command is complete;
the second computer stores a warning in the second dedicated zone if the description of said main command is not complete.

BRIEF DESCRIPTION OF THE DRAWINGS

Further advantages and features of the invention will become apparent from reading the detailed description of embodiments, which are provided by way of non-limiting illustrations, with reference to the accompanying drawings, in which.

DETAILED DESCRIPTION

Figure 1:
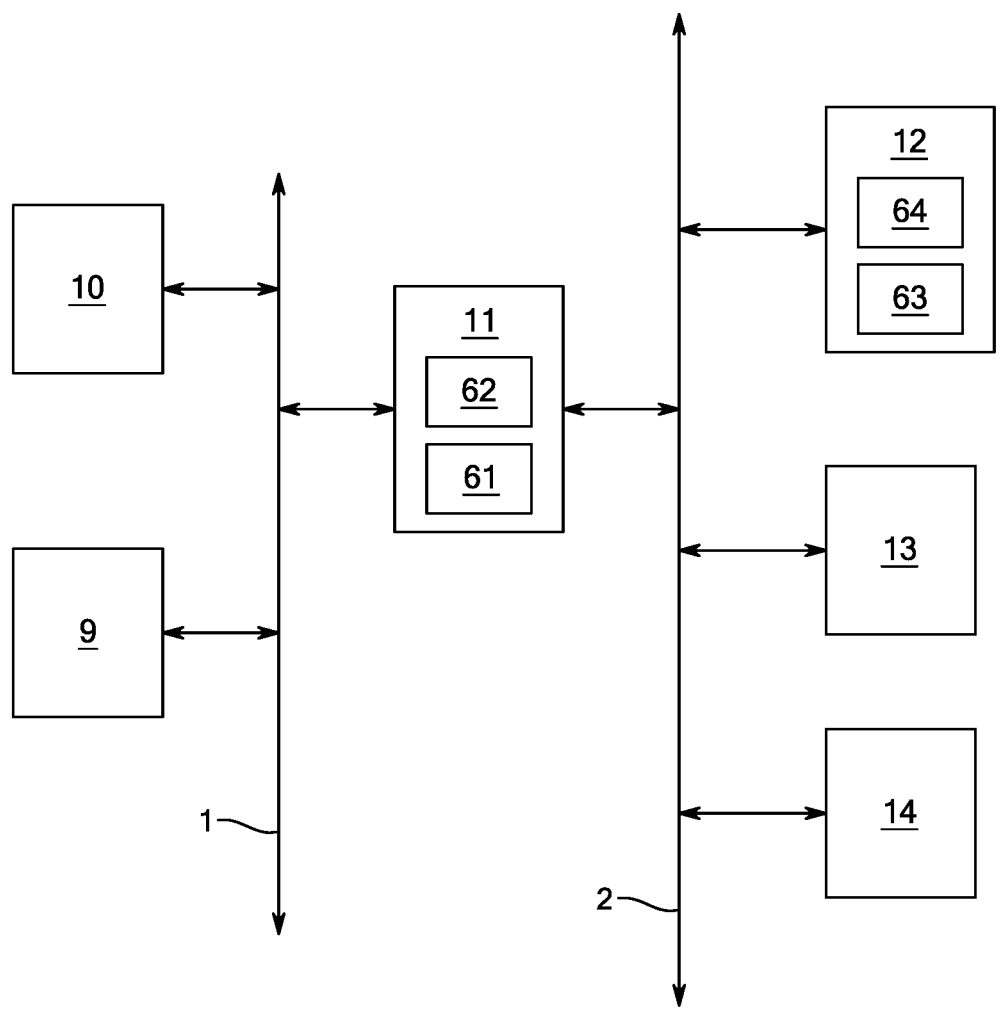
FIG. 1 schematically shows a system on board a vehicle, on which the invention is implemented.

FIG. 1 shows two computers 9, 10 connected to an on-board bus 1 in a vehicle, and three computers 12, 13, 14 connected to an on-board bus 2 in the vehicle. The computer 9 is, for example, an on-board computer dedicated to telecommunications of the IVC (In Vehicle Communication) type. The computer 10 is, for example, an on-board computer of the IVI (In Vehicle Infotainment) type, the computer processing capabilities of which are comparable to those of a microcomputer. Other on-board computers, not shown, can be connected to the on-board bus 1. The computers 12, 13, 14 connected to the on-board bus 2 are preferably on-board computers for controlling-commanding components of the vehicle of the ECU (Electronic Control Unit) type. A computer 11 connected to the on-board bus 1 and to the on-board bus 2 performs gateway functions between the two on-board buses.

Figure 3:
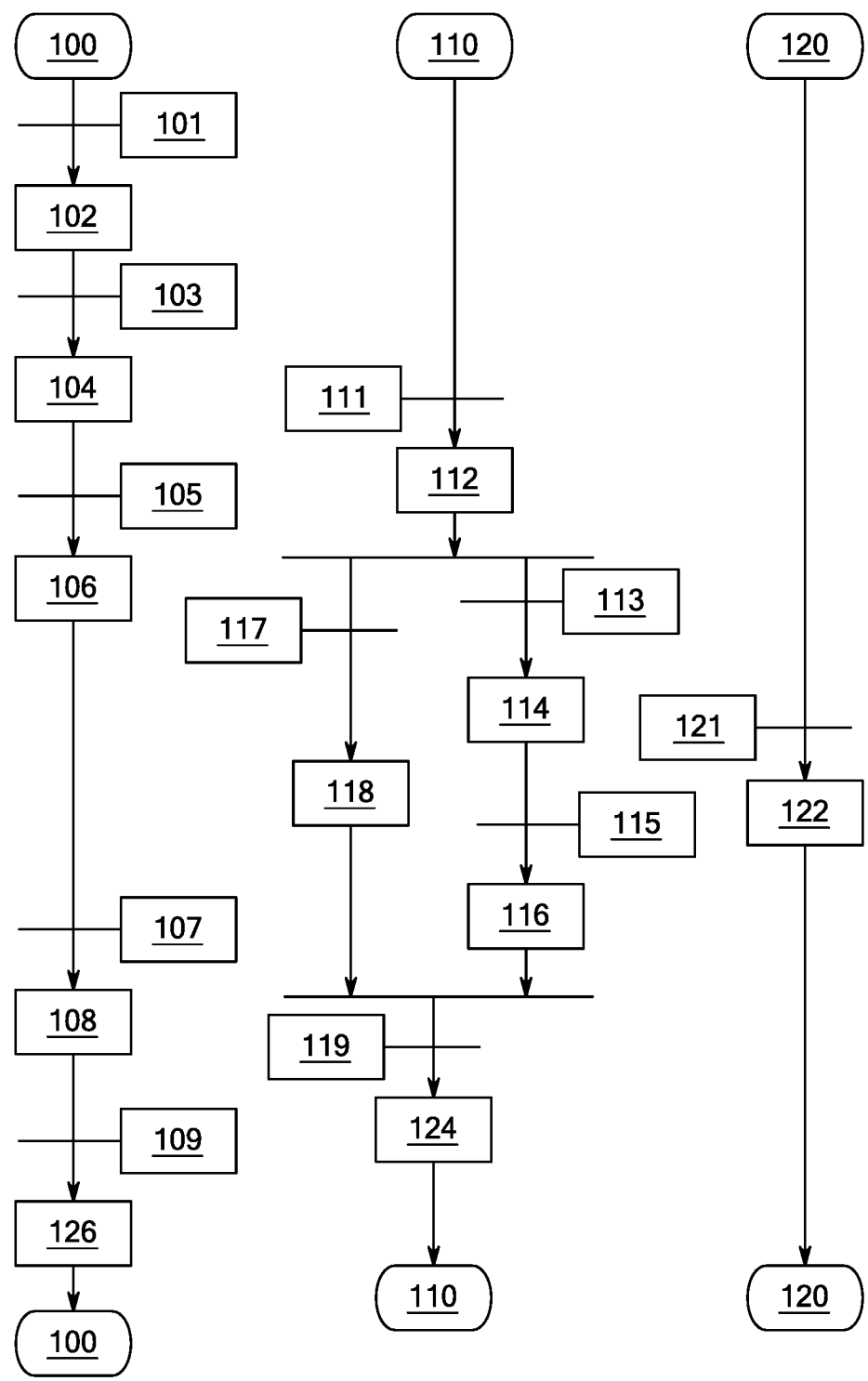
FIG. 3 shows steps of a method according to the invention for processing a main read command.

FIG. 3 shows steps of a dialogue method, in which the computer 10 processes a main command, which is a command for reading resident data in one of the computers 12, 13, 14, for example, in the computer 12. This type of command is useful, for example, for reading a digital component reference, or a version number of the digital component in the computer 12, with a view to deciding, for example, whether or not the digital component needs to be updated. The digital component equally can relate to an executable program, a database or any other digital structure such as, for example, a source program or a table of parameters.

The computer 10, initially in a standby step 100, transitions to a step 102 when a read request submitted by a higher order method, for example, a method for updating the computer 12, confirms a transition 101. By way of an example, the read request can contain an identifier for identifying a computer from among the computers 12, 13, 14 connected to the on-board bus 2, in this case the identifier of the computer 12. The computer identifier can be made up of a computer address in accordance with the communication protocol of the bus 2, of the CAN (Controller Area Network), Flex Ray or TTP type, also known in aeronautic, automotive Ethernet or other fields. The computer identifier also can be made up of a string of ASCII characters that name the computer in its functional universe, for example, "BCM" (Body Control Module), "HEVC" (Hybrid Electric Vehicle Controller), "VDC" (Vehicle Dynamic Control) or other. The advantage of a string of ASCII characters involves being able to designate a computer independently of an on-board system architecture. A further advantage of a string of ASCII characters involves forming a mnemotechnic means that is easier for a human being to understand. By way of another example, the read request can contain a data identifier 63 in the identified computer.

In step 102, the computer 10 builds a description of the main command on the basis of the request that confirmed the transition 101, then generates a write command for the description of the main command in a first dedicated data zone 61, resident in the memory of the computer 11.

Figure 2:
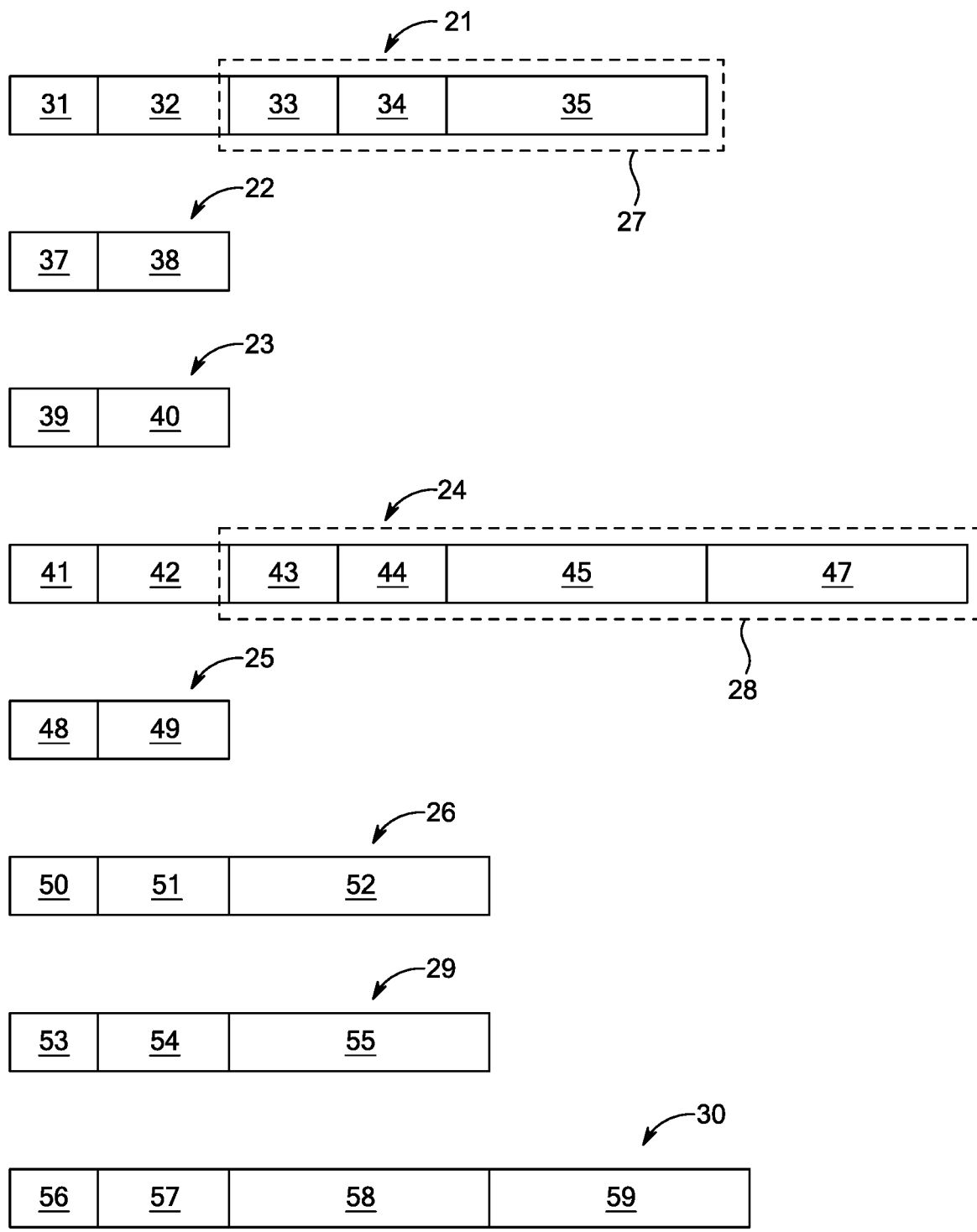
FIG. 2 schematically shows frames of commands, with which the invention is implemented.

FIG. 2 shows an example of a write command that comprises a frame 21. The frame 21 comprises an identifier field 31 identifying the generated command as a write command, an identifier field 32 identifying the first dedicated zone 61, and at least one field 33, 34, 35 for containing the description 27 of the main command.

The field 33 that makes up the description 27 provides a type of main command. Solely by way of a non-limiting illustration, the type of main command is identified, for example, by two letters in ASCII code. The first letter identifies a class of main command, "E" for "Execute", "R" for "Read" or "W" for "Write". The second letter, combined with the first, identifies an action within the main command class, "EA" for "Execute an Activation", "ED" for "Execute a Download", "EI" for "Execute an Installation", "EC" for "Execute a Deletion", "ER" for "Execute a Reinitialization", "RD" for "Read Data", "RX" for "Read Extended data", "WD" for "Write Data". The field 34 that makes up the description 27 provides an on-board computer identifier, in particular as it is indicated in the request. The field 35 that makes up the description 27 contains parameters that are useful for executing the command. By way of an example, when the field 33 contains one of the "EI", "EA" command types, the parameters are identifiers of digital components to be installed, respectively to be activated. In the example shown in FIG. 3, the description 27 of the main command comprises a field 33 providing the "RD" type of main command, an identification field 34 for the computer connected to the bus 2, for example, the functional name of the computer 12, and a parameters field 35, containing an identifier of data to be read as a parameter that is useful for the computer 11 for assisting with the processing of the main command.

More specifically, the use of a write command in accordance with the UDS (Unified Diagnostic Services) protocol has the advantage of benefiting from the mechanism that is generally preinstalled in most on-board computers in the motor vehicle field, in particular for performing the diagnostic functions, without having to modify the low-level communication layers for implementing the dialogue method according to the invention. In this particular case, the field 31 then contains the SID (Service Identifier) $2E, which is the known hexadecimal code for data written by a DID identifier.

A transition 103 for transitioning from step 102 to a step 104 is confirmed when the computer 11 is detected as ready to respond to the write command supported by the frame 21. In this way, if the computer 11 performs a gateway function for another instance of the dialogue method according to the invention, or a gateway function for a command generated by another method such as, for example, a diagnostic method, the computer remains on standby in step 102. The computer 10 does not unnecessarily congest the bus 1 with attempts to transmit commands that would remain ineffective due to the computer 11 being occupied by other functions. In the example of ongoing processing of a diagnostic command specific to another method, momentarily placing the dialogue method on standby in step 102 allows the diagnostic command to be executed without having to interrupt the diagnostic method.

Several solutions can be contemplated for detecting whether the computer 11 is ready to respond to the write command supported by the frame 21. For example, in the case whereby the computer 10 would be the only computer to dialogue with the computer 11 on the bus 1, an upper sequencing layer in the computer 10 could control the ready or not ready state of the computer 11. This solution would be difficult to implement when another computer 9 would dialogue with the computer 11 over the bus 1, for example, in order to execute a remote diagnostic. Otherwise, the computer 10 could, for example, observe the bus 1 in order to detect frames therein that are intended for the computer 11, for which the computer 11 would not be ready to respond to the write command supported by the frame 21. This other solution would quickly raise a problem with respect to complexity in the case of numerous methods using the channel of the bus 1. Other solutions can be contemplated without departing from the scope of the invention.

According to a preferred solution for detecting whether the computer 11 is ready, it is the computer 11 itself that declares whether or not it is ready to process the commands transmitted within the scope of the dialogue method according to the invention. The computer 11 periodically transmits a signal over the bus 1 comprising two states, ready, occupied or not ready.

In an initial standby step 110, the computer 11 sets the signal to the ready state by default. As soon as the computer 11 receives a command, whether from the dialogue method according to the invention or from any other method such as, for example, the diagnostic method, the computer 11 sets the signal to the occupied state until the processing of the ongoing command has finished.

In step 104, with the computer 11 having been detected as ready to respond to the write command, the computer 10 transmits the write command to the computer 11. In order to transmit the write command, the computer 10 can encapsulate the frame 21 in a CAN frame on the bus 1, or in another manner, for example, can encapsulate the frame 21 in an IP frame if the vehicle Ethernet protocol is used on the bus 1.

The reception of the write command in the computer 11 confirms a transition 111 that is required in order to transition the computer 11 from the initial step 110 to a step 114, in which the computer 11 transmits an auxiliary command to the computer of the computers 12, 13, 14 identified in the field 34, for example, the computer 12, to respond to the main command, on the basis of the description 27 of the main command written in the dedicated data zone 61 of the computer 11.

In the particular case of FIG. 3, for which the main command is a command for reading resident data in the computer 12, FIG. 2 provides an example of an auxiliary command that comprises a frame 25 comprising an identification field 48 for a read command and an identification field 49 for the resident data in the computer 12.

More specifically, the use of a read command in accordance with the UDS protocol has the aforementioned advantages. In this particular case, the field 48 then contains the SID $22, which is the known hexadecimal code for data read by a DID identifier. The field 49 contains the DID identifier of the data zone 63 of the computer 12 that was indicated in the field 35 of the frame 21.

The transition 111 can directly transition the method from the initial step 110 to the step 114. Preferably, but not necessarily, the transition 111 transitions the method from the initial step 110 to an intermediate step 112.

In step 112, the computer 11 checks whether or not the main command description 27 is complete, with respect to predetermined security rules that are not part of the subject matter of the present invention. In the event that step 112 is implemented, a transition 113 is confirmed if the main command description 27 is verified as being complete, or a transition 117 is confirmed if the main command description 27 is verified as being incomplete. Step 114 is then activated following the confirmation of the transition 113.

In step 114, or from step 112 if it exists, the computer 11 places the periodic signal in the occupied state, in other words following confirmation of the transition 111 by receiving the write command originating from the computer 10. Concomitantly, the computer 11 responds to the write command by transmitting an acknowledgement of receipt or acknowledgement. For example, when the UDS protocol is used, the computer 11 transmits a frame 22, a first field 37 of which contains the SID code of value $6E, and a second field 38 of which contains the value of the field 32 of the frame 21 to allow the computer 10 to recognize the transmitted write command to which the received acknowledgement of receipt corresponds. In other words, the field 38 forms an identifier field for the first dedicated zone 61.

The reception by the computer 10 of the periodic signal set to the occupied state, or of the frame 22, confirms a transition 105 that transitions the method from step 104 to a step 106 in the computer 10. In step 106, the computer 10 is placed on standby for the signal set to the ready state.

The computer 12, initially in a standby step 120 of the dialogue method according to the invention, confirms a transition 121 when it receives the auxiliary command represented by the frame 25 transmitted by the computer over the on-board bus 2. A confirmation of the transition 121 activates a step 122, in which the computer 12 transmits a response to the received auxiliary command. The response transmitted to the computer 11 comprises a frame 26, which comprises a response identification field 50, in this case a response to the read command, an identification field 51 for said resident data, and a field 52 containing a value of the resident data 63 identified by the field 51, as shown in FIG. 2.

In the particularly advantageous case of the use of the UDS protocol, the field 50 then contains the SID $62, which is the known hexadecimal code of a response to data read by a DID identifier. The field 51 contains the DID identifier of the data zone 63 of the computer 12 that was indicated in the field 49 of the frame 25. The computer 12 then returns to the standby step 120.

The reception of the response by the computer 11 confirms a transition 115 that transitions the dialogue method from step 114 to a step 116, in which the computer 11 generates a description 28 of the response to the main command, which in this case is a command to read the resident data 63 in the computer 12. The response description 28 comprises fields 43, 44, 45, which each respectively contain the values of the fields 33, 34, 35 of the command description 27 for identifying that the response description is indeed the one which corresponds to the main command description. The response description 28 also comprises a field 47, which contains the value contained in the field 52 of the frame 26. The computer 11 stores the response description 28 in a second dedicated data zone 62, resident in the memory of the computer 11.

In step 116, the computer 11 then sets the periodic signal to the ready state.

A transition 107 is confirmed when the computer 10 detects that the computer 11 is ready to respond. In the case of a preferred embodiment of the invention, the transition 107 is confirmed through the reception of the periodic signal in the ready state.

The confirmation of the transition 107 activates a step 108 in the computer 10. In step 108, with the computer 11 having been detected as ready to respond to a read command, the computer 10 transmits a read command from the second dedicated zone 62 intended for the computer 11. The read command is represented, for example, by a frame 23, as shown in FIG. 2. The frame 23 comprises an identification field 39 for identifying a command as a read command, and an identifier field 40 for the second dedicated data zone 62.

In particular, in the advantageous case of the use of the UDS protocol, the field 39 contains the value $22 that identifies a read command, and the field 40 contains a DID value that is the address of the dedicated data zone 62 in the memory of the computer 11.

A transition 119 is confirmed when the computer 11 receives the read command represented by the frame 23.

The confirmation of the transition 119 activates a step 124, in which the computer 11 transmits a response to the computer 10. The response to the received read command comprises a frame 24, which comprises an identifier field 41 for identifying a response to a read command, and an identifier field 42 for identifying the second dedicated zone 62, so as to be able to check that the frame 24 forms the response to the read command represented by the frame 23. The frame subsequently contains the description 28, which comprises the fields 43, 44, 45, each containing a value respectively equal to that contained in each of the fields 33, 34, 35 by way of a note of the description of the main command. The description 28 also comprises the field 47, which contains the response to the main command.

The computer 11 then returns to the initial standby step 110 with respect to the dialogue method according to the invention.

A transition 109 is confirmed when the computer 10 receives the response to the read command, represented by the frame 24.

The confirmation of the transition 109 activates a step 126, in which the computer 10 responds to the main command on the basis of the content of the field 47 extracted from the response to the read command of the second dedicated zone of the computer 11, in which the response transmitted by the computer 12 is stored.

The computer 10 subsequently returns to the initial standby step 100 with respect to the dialogue method according to the invention.

It should be noted from the above disclosure that the use of the UDS protocol for the commands of the dialogue methods according to the invention allows a main command to be processed, which forms a computer updating method, without having to switch from a diagnostic mode to an update mode. The commands remain diagnostic commands in the dialogue between computers. Processing of the updating function is performed by processing a main command in the computer 10 on an upper layer, in a manner comparable to the processing of a diagnostic function. The computer 11 can process frames associated with diagnostic functions by directly transferring them from the bus 1 to the bus 2, and vice versa, as a gateway. The computer 11 can process frames connected to diagnostic functions by processing them by diagnostic functions resident in the computer 11. The computer 11 can process frames connected to updating functions by updating functions resident in the computer 11, as it would for diagnostic functions resident in the computer 11. A single protocol stack is sufficient, namely the UDS protocol stack, for processing as many purely diagnostic commands as updating commands. When a purely diagnostic command is transmitted from the bus 1 to the bus 2, in the absence of a command connected to the updating of a digital component, the computer 11 sets the periodic signal to the occupied state, simply placing a command on standby that is connected to the update that would occur when processing the purely diagnostic command. When a command connected to the update is transmitted from the bus 1 to the bus 2 in the absence of a purely diagnostic command, the computer 11 sets the periodic signal to the occupied state, simply ignoring the purely diagnostic command that would occur when processing the command connected to the update of the digital component, leaving the diagnostic method free to retransmit the purely diagnostic command when the computer 11 returns the periodic signal to the ready state.

The transmission of the read and write commands connected to the processing of the main command from the computer 10 connected to the on-board bus 1 does not require a command received from a remote server in order to relaunch an updating process as soon as the periodic signal is set to the ready state. Thus, the updating process can occur without requiring remote connection of the vehicle, as long as the updating data has been previously downloaded into the computer 10.

The aforementioned description, which has been provided by way of an illustration for an updating process concurrent with a diagnostic process, is applicable to other processes concurrent with the diagnostic process by implementing the dialogue method according to the invention.

The main command of the dialogue method, when it is for reading data in one of the computers 12, 13, 14 connected to the bus 2, more simply could be implemented by a single command to read data intended directly for the computer of the computers 12, 13, 14 that hosts the data, for example, the computer 12. However, this solution, which a priori is simpler, would raise a problem with respect to the management of the total duration that would separate the transmission of the single read command and the reception of the response, which duration would be the sum of the durations required to transmit the single read command from the computer 10 to the computer 11, then to transmit the single read command from the computer 11 to the computer 12, to transmit the response by the computer 12, to transmit the response from the computer to the computer 11, then to transmit the response from the computer 11 to the computer 10. This total duration could quickly become prohibitive in the event of high activity on the buses 1 and 2, as is often the case in a vehicle that is running.

Replacing the single read command with a write command in the first dedicated data zone of the computer 11, followed by a read command in the second dedicated data zone of the computer 11, allows the problem of excessive duration raised in the previous paragraph to be overcome. A first duration that separates the write command of the invention and the response to the write command is reduced to the sum of the durations required to transmit the write command from the computer 10 to the computer 11, then to transmit the response, generally a simple acknowledgement, from the computer 11 to the computer 10. A second duration that separates the read command of the invention and the response to the read command is reduced to the sum of the durations required to transmit the read command from the computer 10 to the computer 11, then to transmit the response from the computer 11 to the computer 10. A third duration that separates the end of the first duration and the start of the second duration does not matter, since in the waiting step 106 of the method the state of the periodic signal simply needs to be continuously read until it is detected as ready. In particular, the method is reliable with respect to an interruption that would occur during said third duration, for example, in the event of the electrical disconnection of the vehicle. The method according to the invention can resume in the step in which it was stopped before the interruption.

According to the alternative embodiment that comprises step 112, in which the computer 11 checks whether or not the description 27 of the main command is complete, a transition 117 is confirmed when the description 27 of the main command is verified as being incomplete. A confirmation of the transition 117 activates a step 118, in which the computer 11 stores a warning in the second dedicated zone 62, then sets the periodic signal to the ready state.

The dialogue method according to the invention is applicable to main commands other than the main command for reading data in a first computer connected to the on-board bus 2, during the processing of which the computer 11 transmits a single auxiliary command to the first computer that is formed by a command to read the data, so as to respond to the main command.

Figure 4:
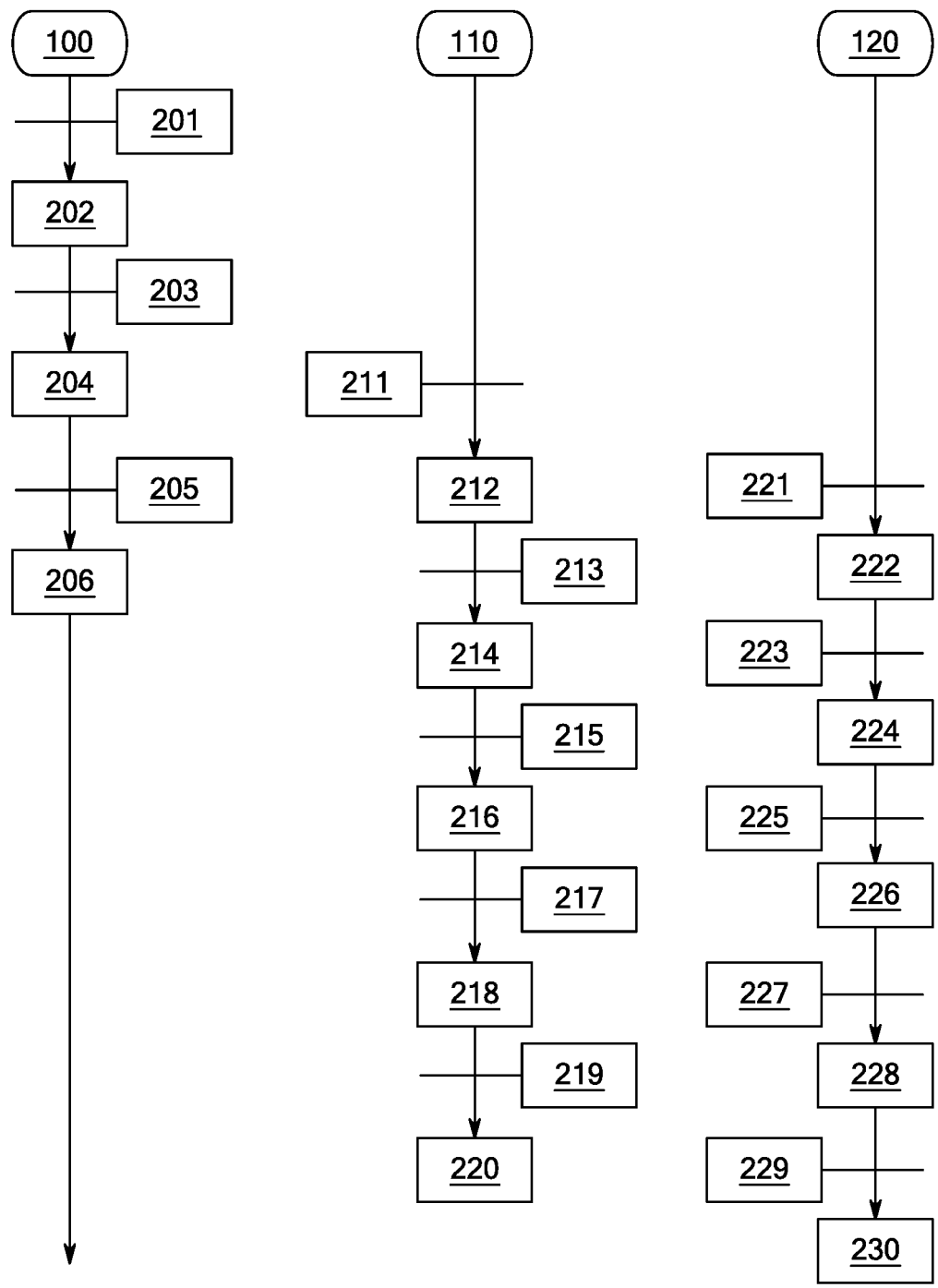
FIG. 4 shows steps of a first method according to the invention for processing a main installation command.

FIG. 4 shows steps of the dialogue method, in which the computer 10 processes a main command, which is a command for installing a digital component, for example, in the computer 12. This type of command is useful, for example, for installing one or more digital components. The digital component equally can relate to an executable program, a database or any other digital structure such as, for example, a source program or a table of configuration parameters.

The computer 10, initially in the standby step 100, transitions to a step 202 when an installation request submitted by a higher order method, for example, a method for updating the computer 12, confirms a transition 201. By way of an example, the installation request can contain an identifier for identifying a computer from among the computers 12, 13, 14 connected to the on-board bus 2, in this case the identifier of the computer 12. By way of another example, the installation request can contain a file, for example, in HTML format with tags identifying blocks of physical memory of the computer 12, in each of which content of the HTML file is written ranging between two tags identifying the same physical memory block 64. The physical memory blocks are of the permanent rewritable memory type, for example, of the EEPROM type.

In step 202, the computer 10 builds a description of the main command from the request that confirmed the transition 201, then generates a write command for the description of the main command in the first dedicated data zone 61, resident in the memory of the computer 11.

FIG. 2 shows an example of a write command, for which the field 31 of the frame 21 continuously identifies the generated command as a write command, the field 32 continuously identifies the first dedicated zone 61. In the description 27 of the main command, the field 33 comprises, for example, two letters "EI" that indicate a main command of the "Execute Installation" type. In the example shown in FIG. 4, the field 34 in particular specifically identifies the target computer connected to the bus 2 to which the main command is applied, for example, the computer 1. The field 35 contains a parameter, the value of which identifies a packet containing at least one digital component to be installed in the target computer.

In the particular case of the use of a write command in accordance with the UDS protocol, the field 31 then contains the SID $2E, which is the known hexadecimal code of data written by a DID identifier, in this case corresponding to the dedicated zone 61.

A transition 203 for transitioning from step 202 to a step 204 is confirmed when the computer 11 is detected as ready to respond to the write command supported by the frame 21. Here again, if the computer 11 performs a gateway function for another instance of the dialogue method according to the invention, or a gateway function for a command generated by another method such as, for example, a diagnostic method, the computer remains on standby in step 202. The computer 10 does not unnecessarily congest the bus 1 with attempts to transmit commands that would remain ineffective due to the computer 11 being occupied by other functions. In the example of ongoing processing of a diagnostic command specific to another method, momentarily placing the dialogue method on standby in step 202 allows the diagnostic command to be executed without having to interrupt the diagnostic method.

It is possible to detect whether the computer 11 is ready, for example, by means of the signal comprising two states, namely ready and occupied, periodically transmitted by the computer 11 over the bus 1, a signal.

In the initial standby step 110, the computer 11 sets the signal to the ready state by default. As soon as the computer 11 receives a command, whether this is the dialogue method according to the invention or any other method such as, for example, the diagnostic method, the computer 11 sets the signal to the occupied state until the processing of the ongoing command is complete.

During step 204, with the computer 11 having been detected as ready to respond to the write command, the computer 10 transmits the write command to the computer 11. In order to transmit the write command, the computer 10 can encapsulate the frame 21 in a CAN frame on the bus 1, or in another manner, for example, can encapsulate the frame 21 in a frame on an IP if the vehicle Ethernet protocol is used on the bus 1.

The reception of the write command in the computer 11 confirms a transition 211, which transitions the computer 11 from the initial step 110 to a step 212, in which the computer 11 writes the description 27 in the first dedicated zone 61, then immediately transmits an acknowledgement of the proper execution of the write command to the computer 10. By way of an example when the UDS protocol is used, the acknowledgement of proper execution of the write command is represented by the frame 22, in which the field 37 contains the value $6E and the field 38 contains the DID of the zone 61.

The reception of the frame 22 in the computer 10 confirms a transition 205 that transitions the computer 10 from step 204 to a step 206, in which the computer reads the state of the signal periodically transmitted by the computer 11, while waiting to read the ready state. In an advantageous variant of the method according to the invention, the periodic signal also comprises an indication of the state of progress of the execution of the steps in the computer 11.

During step 212, the computer 11 sets the periodic signal to the occupied state, then transmits a series of one or more first auxiliary commands to the computer of the computers 12, 13, 14 identified in the field 34, for example, the computer 12, in order to respond to the main command, on the basis of the description 27 of the main command, written in the dedicated data zone 61 of the computer 11. When the periodic signal also comprises an indication of the state of progress, the computer 11 indicates the state of progress corresponding to step 212.

In the particular case of FIG. 4, in which the main command is a command for installing at least one digital component in the computer, each first auxiliary command involves reading an attribute of the computer 12, the knowledge of which is useful for correctly installing the one or more digital components. The example provided in FIG. 2 can be used by way of a first auxiliary command, which command comprises the frame 25 comprising the identification field 48 for a read command and the identification field 49 for the resident data in the computer 12, corresponding to the read attribute.

The reception of the series of first auxiliary commands in the computer 12 confirms a transition 221 that activates a step 222, in which the computer 12 transmits a response to each first received auxiliary command.

When commands are used in accordance with the UDS protocol, the field 48 contains the SID $22. Each response to a first auxiliary command on the model of the frame 26 in FIG. 2 contains the SID $62 in the field 50, the identification of the attribute in the field 51 and the read value of the attribute in the field 52.

The reception in the computer 11 of the last response to the series of first auxiliary commands confirms a transition 213 that transitions the computer 11 from the step 212 to a step 214, in which the computer 11 transmits a series of one or more second auxiliary commands to the computer 12 for checking that the computer 12 is not troubled by a fault likely to hinder the installation of the digital component.

FIG. 2 provides an example of an auxiliary command that comprises a frame 29 comprising an auxiliary command designation field 53, an identification field 54 for identifying a target in the computer 12, which the auxiliary command relates to, and which incidentally may or may not comprise a command extension field 55. For a second auxiliary command, the target is a fault code in particular.

The reception of the series of second auxiliary commands in the computer 12 confirms a transition 223 that activates a step 224, in which the computer 12 transmits a response to each second received auxiliary command.

When commands are used in accordance with the UDS protocol, the field 53 contains the SID $29 that denotes the reading of DTC ("Diagnostic Trouble Codes") information. The field 54 contains a fault identification code generally based on five alphanumeric characters. Solely by way of a non-limiting example, the first character is the letter P for denoting a powertrain of the vehicle (for example, comprising an engine and a gearbox), the letter C for denoting a vehicle chassis, the letter B for denoting a vehicle body, the letter U for denoting a user network. Also, solely by way of a non-limiting example, the second character is the number 0 for denoting a generic fault, the number 1 for denoting a manufacturing fault. The following characters refer to elements of the sub-system of the system identified by the letter in the header of the fault code, for example, P01xx for the fuel and oxidant measurements, P02xx for the fuel and oxidant measurements more specifically associated with the injection circuit, P04xx for the auxiliary emission controls. Each response to a second auxiliary command, shown on the model of the frame 30 in FIG. 2, contains the SID $59 in a field 56, a note of the fault code in a field 57 and the read value of a state of the fault code in a field 59, for example, fault or non-fault.

When the periodic signal also comprises an indication of the state of progress, the computer 11 indicates the state of progress corresponding to the fault or non-fault state contained in the field 59.

The reception in the computer 11 of a last response to the series of second auxiliary commands confirms a transition 215 that transitions the computer 11 from step 214 to a step 216, in which the computer 11 transmits a third auxiliary command to the computer 12 for starting an update session.

The frame 29 shown in FIG. 2 can be used to represent the third auxiliary command. For the third auxiliary command, the target particularly involves closing the operation performed in the computer 12.

The reception of the third auxiliary command in the computer 12 confirms a transition 225 that activates a step 226, in which the computer 12 transmits a response to the third received auxiliary command.

When commands are used in accordance with the UDS protocol, the field 53 contains the SID $10 that denotes the control of a diagnostic session. By way of a reminder, the availability of various services depends on the diagnostic session that is active. For example, the session called "Extended Diagnostic Session" is used to release additional diagnostic functions such as, for example, the adjustment of sensors. By way of another example, the session called "Safety system Diagnostic Session" is used to test all the diagnostic functions that are critical for security such as, for example, testing the airbags. In the absence of a particular diagnostic session, a "Default Session" is generally active, in particular in step 120, and is maintained until the transition 225 is confirmed. The field 54 contains a session identification code, which in this case is specifically dedicated to the installation of one or more digital components in the computer 12 called "FOTA", for example. The response to the third auxiliary command, shown on the model of the frame 30 in FIG. 2, contains the SID $50 in the field 56, and a note of the session identification code in the field 57. When the periodic signal also comprises a state of progress indication, the computer 11 indicates the state of progress corresponding to the opening of the update session.

The reception in the computer 11 of a response to the third auxiliary command confirms a transition 217 that transitions the computer 11 from step 216 to a step 218, in which the computer 11 transmits a fourth auxiliary command to the computer 12 for checking for the absence of faults in the memory blocks of the computer 12, with a view to using them to write updates of digital components therein.

The frame 29 shown in FIG. 2 can be used to represent the fourth auxiliary command. For the fourth auxiliary command, the target is a memory fault code in particular.

The reception of the fourth auxiliary command in the computer 12 confirms a transition 227 that activates a step 228, in which the computer 12 transmits a response to the fourth received auxiliary command.

When commands are used in accordance with the UDS protocol, the field 53 contains the SID $19 that denotes diagnosed fault reading. The response to the fourth auxiliary command, shown on the model of the frame 30 in FIG. 2, contains the SID $59 in the field 56, and a note of the fault code in the field 57. The field 59 contains a value that indicates whether the fault identified by the code contained in the field 57 is present or absent. When the periodic signal also comprises a state of progress indication, the computer 11 indicates the state of progress corresponding to the state relating to the presence or the absence of the fault contained in the field 59.

The reception in the computer 11 of a response to the last fourth auxiliary command confirms a transition 219 that transitions the computer 11 from step 218 to a step 220, in which the computer 11 transmits a series of fifth auxiliary commands to the computer 12 for checking for the absence of faults in the memory block counters of the computer 12, with a view to using them to write the updates of digital components in the memory blocks.

The frame 29 shown in FIG. 2 can be used to represent each fifth auxiliary command. For the fifth auxiliary command, the target is a memory counter fault code in particular.

The reception of the series of fifth auxiliary commands in the computer 12 confirms a transition 229 that activates a step 230, in which the computer 12 transmits a response to each fifth received auxiliary command.

When commands are used in accordance with the UDS protocol, the field 53 contains the SID $19 that denotes diagnosed fault reading. The response to each fifth auxiliary command, shown on the model of the frame 30 in FIG. 2, contains the SID $59 in the field 56, and a note of the fault code in the field 57. The field 59 contains a value that indicates whether the fault identified by the code contained in the field 57 is present or absent. When the periodic signal also comprises a state of progress indication, the computer 11 indicates the state of progress corresponding to the state relating to the presence or the absence of the fault contained in the field 59.

Figure 5:
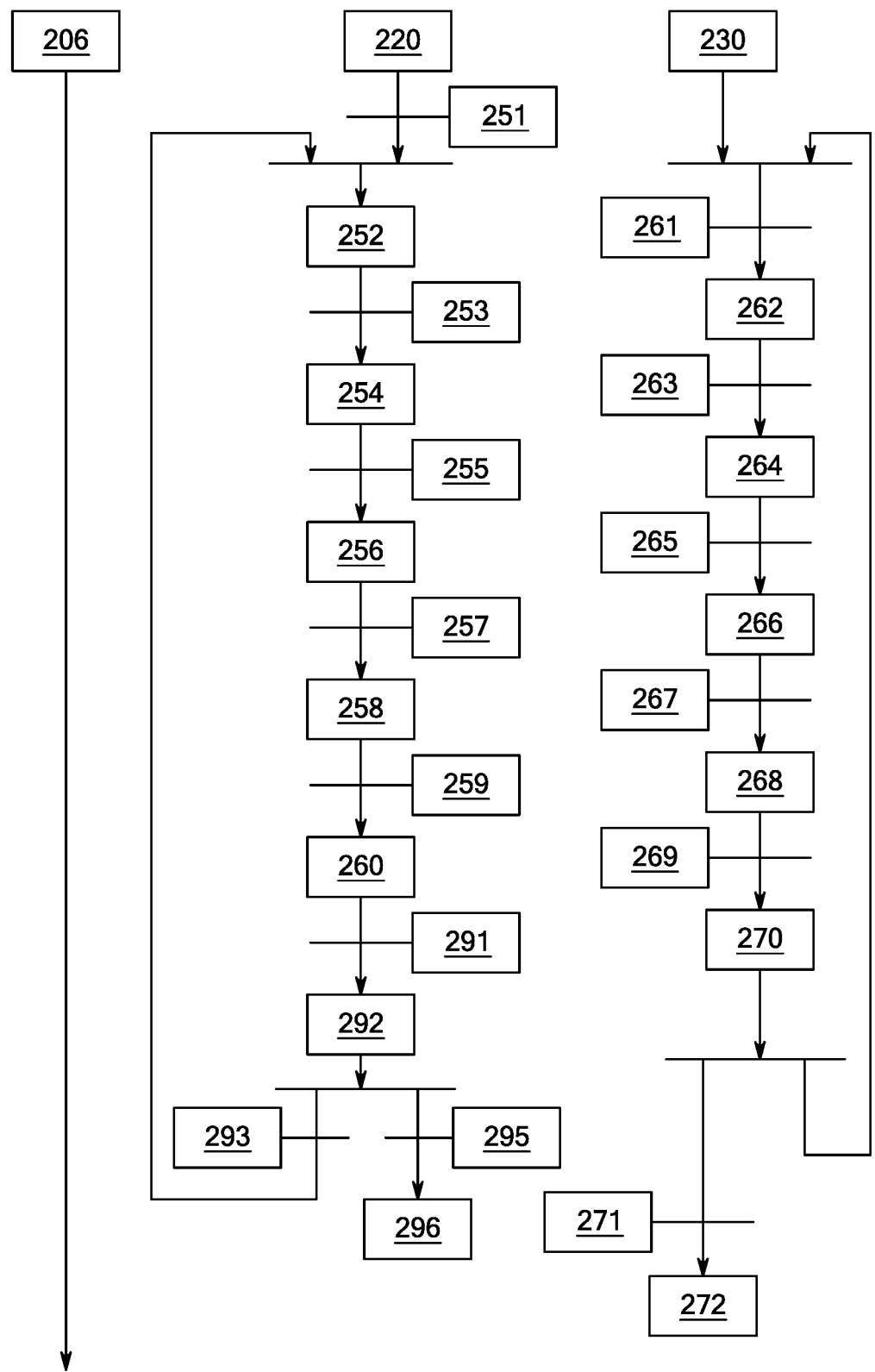
FIG. 5 shows steps of a second part of a method according to the invention for processing a main installation command.

FIG. 5 shows the steps following those of FIG. 4. The reception in the computer 11 of a response to the last fifth auxiliary command confirms a transition 251 that transitions the computer 11 from step 220 to a step 252 of a first loop, in which the computer 11 transmits a sixth auxiliary command to the computer 12 to read a start address of the first memory block in the memory of the computer 12.

The frame 29 shown in FIG. 2 can be used to represent each sixth auxiliary command. For the sixth auxiliary command, the target is particularly a DID data reference relating to a memory blocks addressing register in the computer 12.

The reception of the sixth auxiliary command in the computer 12 confirms a transition 261 that activates a step 262, in which the computer 12 transmits a response to the sixth received auxiliary command.

When commands are used in accordance with the UDS protocol, the field 53 contains the SID $22 that denotes reading of data identified by the DID reference of the field 54. The response to the sixth auxiliary command, shown on the model of the frame 30 in FIG. 2, contains the SID $62 in the field 56, and a note of the DID reference in the field 57. The field 59 contains a value that indicates the start address of the first memory block provided to load the first digital component therein.

The reception in the computer 11 of a response to the sixth auxiliary command confirms a transition 253 that transitions the computer 11 from step 252 to a step 254 of the first loop, in which the computer 11 transmits a seventh auxiliary command to the computer 12 for writing a reference for the first digital component in the header of the first memory block in the memory of the computer 12.

The frame 29 shown in FIG. 2 can be used to represent each seventh auxiliary command. For the seventh auxiliary command, the target is particularly a DID reference for data relating to a digital component naming register in the computer 12.

The reception of the seventh auxiliary command in the computer 12 confirms a transition 263 that activates a step 264, in which the computer 12 transmits a response to the seventh received auxiliary command.

When commands are used in accordance with the UDS protocol, the field 53 contains the SID $2E that denotes the writing of data identified by the DID reference of the field 54. The response to the seventh auxiliary command, shown on the model of the frame 30 in FIG. 2, contains the SID $6E in the field 56, and a note of the DID reference in the field 57. The field 59 contains a value that indicates an acknowledgement of the write command.

The reception in the computer 11 of a response to the seventh auxiliary command confirms a transition 255 that transitions the computer 11 from step 254 to a step 256 of the first loop, in which the computer 11 transmits an eighth auxiliary command to the computer 12 requesting that a digital component is loaded into a first memory block of the computer 12.

The frame 29 shown in FIG. 2 can be used to represent the eighth auxiliary command. For the eighth auxiliary command, the target is the address of the first memory block in particular.

The reception of the eighth auxiliary command in the computer 12 confirms a transition 265 that activates a step 266, in which the computer 12 deletes the content of the ongoing memory block, then transmits a response to the eighth received auxiliary command, which acknowledges the proper execution of the eighth command. It should be noted in this case that a physical memory block of the rewritable type needs to be deleted before rewriting.

When commands are used in accordance with the UDS protocol, the field 53 contains the SID $34 that denotes a request to load from the computer 11 to the computer 12. A field 55 contains a size of the digital component to be loaded. The response to the eighth auxiliary command, shown on the model of the frame 30 in FIG. 2, contains the SID $74 in the field 56 and a note of the address of the memory block in the field 57. The field 58 notes the size of the digital component to be loaded. The field 59 contains a value that indicates a maximum acceptable loading size.

The reception in the computer 11 of a response to the eighth auxiliary command confirms a transition 257 that transitions the computer 11 from the step 256 to a step 258 of the first loop, in which the computer 11 transmits a ninth auxiliary command to the computer 12 for transferring the content of the digital component to the first memory block of the computer 12.

The frame 29 shown in FIG. 2 can be used to represent the ninth auxiliary command. For the ninth auxiliary command, the target is the address of the first memory block in particular.

The reception of the ninth auxiliary command in the computer 12 confirms a transition 267 that activates a step 268, in which the computer 12 transmits a response to the ninth received auxiliary command.

When commands are used in accordance with the UDS protocol, the field 53 contains the SID $36 that denotes a command to transfer content of the digital component to the current physical memory block. In a known manner, the transfer is performed by maximum sized packets. If the size of the content exceeds the maximum size of a packet the transfer is repeated until all the content is transmitted. The response to the ninth auxiliary command, shown on the model of the frame 30 in FIG. 2, contains the SID $76 in the field 56, and a note of the address of the memory block in the field 57.

The reception in the computer 11 of a response to the ninth auxiliary command confirms a transition 259 that transitions the computer 11 from the step 258 to a step 260 of the first loop, in which the computer 11 transmits a tenth auxiliary command to the computer 12 to quit the transfer.

The frame 29 shown in FIG. 2 can be used to represent the tenth auxiliary command.

The reception of the tenth auxiliary command in the computer 12 confirms a transition 269 that activates a step 270, in which the computer 12 transmits a response to the tenth received auxiliary command.

When commands are used in accordance with the UDS protocol, the field 53 contains the SID $37 that denotes a transfer mode exit command. The response to the ninth auxiliary command, shown on the model of the frame 30 in FIG. 2, contains the SID $77 in the field 56, and a note of the address of the memory block in the field 57.

The reception in the computer 11 of a response to the tenth auxiliary command confirms a transition 291 that transitions the computer 11 from the step 260 to a step 292 of the first loop, in which the computer 11 checks whether a subsequent digital component exists that is to be loaded into a subsequent memory block.

The presence of a subsequent digital component confirms a transition 293 that loops the method back to the re-execution of steps 252 to 292, each adapted to the subsequent physical memory block in terms of identification, of size, and of memory block address.

The absence of a digital component requiring a subsequent physical memory block confirms a transition 295 that activates a step 296, in which the computer 11 transmits an eleventh auxiliary command to the computer for checking for the absence of faults in writing the memory blocks of the computer 12.

In this case, the frame 29 shown in FIG. 2 also can be used to represent the eleventh auxiliary command. For the eleventh auxiliary command, the target is a memory fault code in particular.

The reception of the eleventh auxiliary command in the computer 12 confirms a transition 271 that activates a step 272, in which the computer 12 transmits a response to the eleventh received auxiliary command.

When commands are used in accordance with the UDS protocol, the field 53 contains the SID $19 that denotes diagnosed fault reading. The response to the eleventh auxiliary command, shown on the model of the frame 30 in FIG. 2, contains the SID $59 in the field 56, and a note of the fault code in the field 57. The field 59 contains a value that indicates whether the fault identified by the code contained in the field 57 is present or absent.

Figure 6:
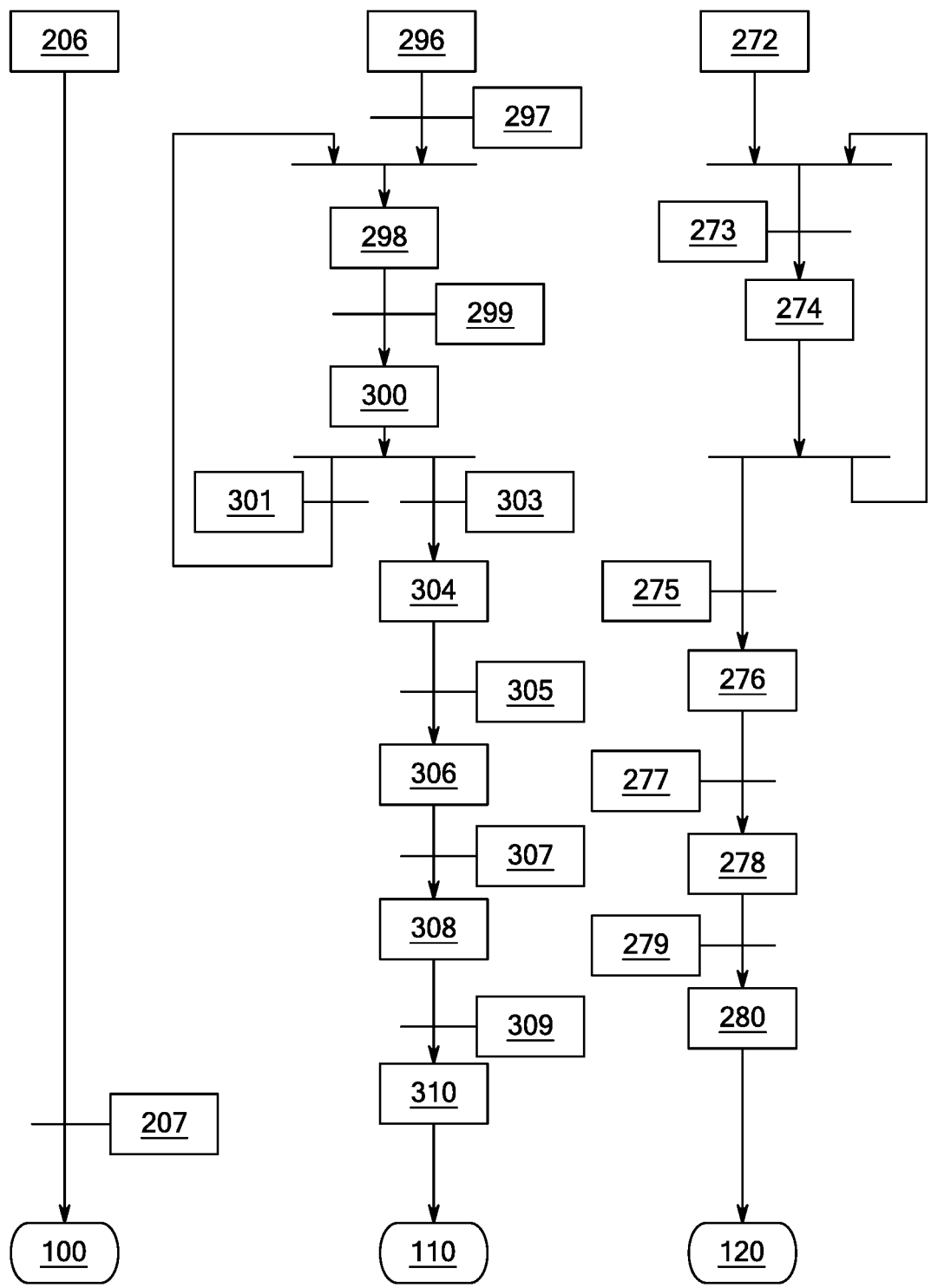
FIG. 6 shows steps of a third and final part of a method according to the invention for processing a main installation command.

FIG. 6 shows the final steps of the method following those shown in FIG. 5. The reception in the computer of a response to the eleventh auxiliary command confirms a transition 297 of the second loop that activates a step 298, in which the computer 11 transmits a twelfth auxiliary command to the computer 12 for activating a first local program, in which the computer 12 checks that the first digital component has been correctly written in the first memory block in the memory of the computer 12.

The frame 29 shown in FIG. 2 can be used to represent each twelfth auxiliary command. For the twelfth auxiliary command, the target registered in the field in particular is a condenser program reference stored in the memory in the computer 12. The field 55 contains an address of the memory block to be checked.

The reception of the twelfth auxiliary command in the computer 12 confirms a transition 273 that activates a step 274, in which the computer 12 activates the condenser program, which particularly involves computing a condensation of the content written in the physical memory block. The computer 12 transmits a response to the twelfth received auxiliary command that contains the computed condensation. The response to the twelfth auxiliary command allows the computer 11 to compare the condensation computed by the computer 12 with a condensation held by the computer 11 before the content is loaded into the physical memory block. The computer 11 thus can check that the content of the physical memory block, following rewriting, is consistent with the content to be loaded into the physical memory block.

When commands are used in accordance with the UDS protocol, the field 53 contains the SID $31 that denotes the activation of a program identified by the program reference of the field 54. The response to the twelfth auxiliary command, shown on the model of the frame 30 in FIG. 2, contains the SID $62 in the field 56, and a note of the DID reference in the field 57. The field 59 contains a value that indicates the start address of the first memory block provided to load the first digital component therein.

The reception in the computer 11 of a response to the sixth auxiliary command confirms a transition 299 that activates a step 300, in which the computer 11 checks whether a next physical memory block exists for the subsequent loading of a digital component.

The existence of the next physical memory block confirms a transition 301 that loops back to the step 298, in which the first block is replaced by the next block and so on until the last physical memory block.

The absence of the next physical memory block confirms a transition 303 that activates a step 304, in which the computer 11 transmits a thirteenth auxiliary command to the computer 12 for reading a memory of the computer 12 intended for storing detected faults.

The reception of the thirteenth auxiliary command in the computer 12 confirms a transition 275 that activates a step 276, in which the computer 12 transmits a response to the thirteenth received auxiliary command that contains the faults detected when executing the previous steps.

When commands are used in accordance with the UDS protocol, the field 53 contains the SID $19 that denotes the reading of Diagnostic Trouble Code (DTC) information. It should be noted that each DTC fault processed by the computer 12 is stored with its own code in the dedicated memory of the computer 12, called error memory, that can be read at any time. In association with each fault, additional information, particularly associated with the context relating to the occurrence of the fault, is also stored and able to be read at any time. The response to the thirteenth auxiliary command, shown on the model of the frame 30 in FIG. 2, contains the SID $59 in the field 56, and a note of the DID reference in the field 57. The field 59 uses the content of the error memory.

The reception in the computer 11 of a response to the thirteenth auxiliary command confirms a transition 305 that activates a step 306, in which the computer 11 transmits a fourteenth auxiliary command to the computer 12. The effect of the fourteenth auxiliary command is to cause the computer 12 to exit the open session in step 216 in order to return it to the default session. Thus, the computer 12 only takes into account, between steps 216 and 306, the commands originating from the computer 11, within the context of the dialogue method set forth above. Before step 216 and after step 306, the computer 12 can take into account as many commands originating from the computer 11, within the context of the instance of the aforementioned dialogue method in the light of FIGS. 5 and 6, as there are commands originating from the computer 11, within the context of another instance of the aforementioned dialogue method in the light of FIG. 4, or even as there are received commands, within the context of another method such as, for example, a local diagnostic method or a remote diagnostic method.

The reception of the fourteenth auxiliary command in the computer 12 confirms a transition 277 that activates a step 278, in which the computer 12 transmits a response to the fourteenth received auxiliary command.

When commands are used in accordance with the UDS protocol, the field 53 contains the SID $10 that denotes diagnostic session control. The field 54 contains the session identification code, which, in this case, is the "Default Session". The response to the fourteenth auxiliary command, shown on the model of the frame 30 in FIG. 2, contains the SID $50 in the field 56 and a note of the session identification code in the field 57. When the periodic signal also comprises an indication of the state of progress, the computer 11 indicates the state of progress corresponding to the closure of the update session.

The reception in the computer 11 of a response to the fourteenth auxiliary command confirms a transition 307 that transitions the computer 11 from step 306 to a step 308, in which the computer 11 transmits a fifteenth auxiliary command to the computer 12 for activating a second local program.

According to a first embodiment, the computer 12 comprises a single activatable bank of rewritable memory and two non-activatable banks of rewritable memory. The single activatable bank comprises memory blocks, which contain the digital components executed and/or accessed in real time by the on-board computer 12 when the vehicle is running. A first non-activatable bank comprises the memory blocks mentioned above for loading the one or more updated digital components. A second non-activatable bank is used by the second local program, the execution of which involves copying the content of the activatable bank into the second non-activatable bank before copying the content of the first non-activatable bank into the single activatable bank when the vehicle is not running, so as to activate the single activatable bank with the updated digital components the next time the vehicle runs.

According to a second embodiment, the computer 12 comprises two twin activatable banks of rewritable memory. A first twin activatable bank comprises memory blocks that contain the digital components executed and/or accessed in real time by the on-board computer when the vehicle is running. A second twin activatable bank comprises the memory blocks mentioned above for loading the one or more updated digital components. The execution of the second local program then simply involves switching to an initiation of real time execution from the first twin activatable bank to the second twin activatable bank when the vehicle is not running, so as to activate the second twin activatable bank with the updated digital components the next time the vehicle runs, for which the second twin activatable bank will act as the first twin activable bank, and vice versa.

It should be noted that all or some of the auxiliary commands preceding the fifteenth auxiliary command can be performed when the vehicle is running. The two embodiments described above have the advantage of only requiring a short duration for switching the operation of the vehicle to executing and/or accessing digital components in real time, in other words, a short duration for stopping the vehicle running in order to update digital components.

The frame 29 shown in FIG. 2 can be used to represent the fifteenth auxiliary command. For the fifteenth auxiliary command, the target written in the field 54 in particular is a switch program reference stored in the memory in the computer 12.

The reception of the fifteenth auxiliary command in the computer 12 confirms a transition 279 that activates a step 280, in which the computer 12 activates the second local program, in other words the switch program before transmitting a response to the fifteenth received auxiliary command that contains an acknowledgement of proper execution of the second local program. The computer 11 thus can check that the computer 12 is ready for any future access and/or execution of digital components that are read as up-to-date.

When commands are used in accordance with the UDS protocol, the field 53 contains the SID $31 that denotes the activation of a program identified by the program reference of the field 54. The response to the fifteenth auxiliary command, shown on the model of the frame 30 in FIG. 2, contains the SID $62 in the field 56.

The reception in the computer 11 of a response to the fifteenth auxiliary command confirms a transition 309 that activates a step 310, in which the computer 11 sets the periodic signal to the ready state. The periodic signal can also comprise a degree of progress in phases consolidating several auxiliary commands. For example, the computer 11 places the degree of progress in step 212 in order to indicate a parameter verification phase, in step 252 in order to indicate an ongoing installation phase, and in step 310 in order to indicate the end of an installation phase.

The reception in the computer 10 of a periodic signal in the ready state confirms a transition 207 that reactivates the initial step 100 in the computer 10, pending any other main command.

The invention claimed is:

1. A method for dialoguing from a first on-board bus in a vehicle, the method comprising:
connecting a first computer directly to a second on-board bus in the vehicle, the first computer not being directly connected to the first on-board bus in the vehicle;
connecting the first on-board bus in the vehicle to the second on-board bus in the vehicle by a second computer directly connected to the first on-board bus in the vehicle and to the second on-board bus in the vehicle;
connecting a third computer, which is in the vehicle, directly to the first on-board bus in the vehicle, the third computer processing a main command for the first computer, and the third computer not being directly connected to the second on-board bus in the vehicle;
generating, via the third computer, which is in the vehicle and directly connected to the first on-board bus in the vehicle, a write command to write a description of said main command in a first dedicated data zone of the second computer;
transmitting, via the third computer, which is in the vehicle and directly connected to the first on-board bus in the vehicle, said write command to the second computer when the second computer is detected as ready to respond to said write command;
transmitting, via the second computer, one or more auxiliary commands to the first computer in order to respond to the main command after receiving said write command;
transmitting, via the first computer, a response to each received auxiliary command;
storing, via the second computer, at least one received response in a second dedicated data zone;
transmitting, via the third computer, which is in the vehicle and directly connected to the first on-board bus in the vehicle, a read command to read said second dedicated zone for the second computer when the second computer is detected as ready to respond to said read command;
transmitting, via the second computer, a response to the received read command; and responding, via the third computer, which is in the vehicle and directly connected to the first on-board bus in the vehicle, to the main command upon at least one receipt of a response to the read command to read the second dedicated zone of the second computer, in which the response transmitted by the first computer is stored.

2. The method as claimed in claim 1, wherein a signal comprising two states, including ready and not ready, is periodically transmitted by the second computer over the first on-board bus in the vehicle, and the method further comprising:
setting, via the second computer, the signal to the not ready state upon receipt of the write command originating from the third computer, which is in the vehicle and directly connected to the first on-board bus in the vehicle; and
setting, via the second computer, the signal to the ready state upon receipt of the response originating from the first computer.

3. The method as claimed in claim 2, further comprising:
transitioning the third computer, which is in the vehicle and directly connected to the first on-board bus in the vehicle, into standby for the signal set to the ready state after having received said signal set to the not ready state.

4. The method as claimed in claim 2, wherein said signal further comprises a degree of progress of the one or more of said auxiliary commands transmitted by the second computer.

5. The method as claimed in claim 2, further comprising:
transitioning the third computer, which is in the vehicle and directly connected to the first on-board bus in the vehicle, into standby for the signal set to the ready state after having received the signal set to the not ready state, wherein
the signal further comprises a degree of progress of the one or more of the auxiliary commands transmitted by the second computer, and
the read commands and the write commands are commands in accordance with UDS (Unified Diagnostic Services) protocol.

6. The method as claimed in claim 1, wherein said write command comprises a first frame, which comprises a first identifier field for said write command, a first identifier field for the first dedicated zone, and at least one field of the description of the main command.

7. The method as claimed in claim 1, wherein the description of the main command comprises a standard field for the main command, an identification field for the second computer, and a useful parameter field for the second computer for establishing the transmitted response.

8. The method as claimed in claim 1, further comprising:
transmitting, via the second computer, an acknowledgement for the first computer upon receipt of said write command.

9. The method as claimed in claim 8, wherein the acknowledgement comprises a second frame, which comprises an acknowledgement identifier field and a second identifier field for the first dedicated zone.

10. The method as claimed in claim 1, wherein said read command transmitted by the third computer, which is in the vehicle and directly connected to the first on-board bus in the vehicle, comprises a third frame, which comprises a second command identification field and a first identifier field for the second dedicated zone.

11. The method as claimed in claim 1, wherein said response to the read command comprises a fourth frame, which comprises a fourth identifier field for the response to the read command, a second identifier field for the second dedicated zone, at least one description note field for the main command, and a content field for the response to the main command.

12. The method as claimed in claim 1, wherein the read commands and the write commands are commands in accordance with UDS (Unified Diagnostic Services) protocol.

13. The method as claimed in claim 1, further comprising:
checking, via the second computer, whether or not the description of said main command is complete upon receipt of said write command;
transmitting, via the second computer, one or more auxiliary commands to the first computer in order to respond to the main command only when the description of said main command is complete; and
storing, via the second computer, a warning in the second dedicated zone when the description of said main command is not complete.

14. The method as claimed in claim 1, wherein said main command is a command for reading resident data in the first computer, the auxiliary command comprises a fifth frame, which comprises an identification field for a read command and an identification field for said resident data, and the response transmitted by the first computer comprises a sixth frame, which comprises an identification field for a response to the read command, an identification field for said resident data, and a field containing a value for said resident data.

15. The method as claimed in claim 1, wherein said main command is a command for installing a digital component in said first computer.

16. The method as claimed in claim 1, wherein
the first computer, the second computer, and the third computer are all in the vehicle.

17. A system for dialoguing from a first on-board bus in a vehicle, the system comprising:
a first computer directly connected to a second on-board bus in the vehicle, the first computer not being directly connected to the first on-board bus in the vehicle;
a second computer that connects the first on-board bus in the vehicle to the second on-board bus in the vehicle, the second computer directly connected to the first on-board bus in the vehicle and to the second on-board bus in the vehicle; and
a third computer, which is in the vehicle, directly connected to the first on-board bus in the vehicle, the third computer processing a main command for the first computer, and the third computer not being directly connected to the second on-board bus in the vehicle, wherein
the third computer, which is in the vehicle and directly connected to the first on-board bus in the vehicle, generates a write command to write a description of said main command in a first dedicated data zone of the second computer,
the third computer, which is in the vehicle and directly connected to the first on-board bus in the vehicle, transmits said write command to the second computer when the second computer is detected as ready to respond to said write command,
the second computer transmits one or more auxiliary commands to the first computer in order to respond to the main command after receiving said write command,
the first computer transmits a response to each received auxiliary command,
the second computer stores at least one received response in a second dedicated data zone, the third computer, which is in the vehicle and directly connected to the first on-board bus in the vehicle, transmits a read command to read said second dedicated zone for the second computer when the second computer is detected as ready to respond to said read command, the second computer transmits a response to the received read command, and the third computer, which is in the vehicle and directly connected to the first on-board bus in the vehicle, responds to the main command upon at least one receipt of a response to the read command to read the second dedicated zone of the second computer, in which the response transmitted by the first computer is stored.

* * * * *